March 11, 1924.
A. G. ROSS
1,486,161
SHAFT BEARING SEAL
Filed Oct. 11, 1922
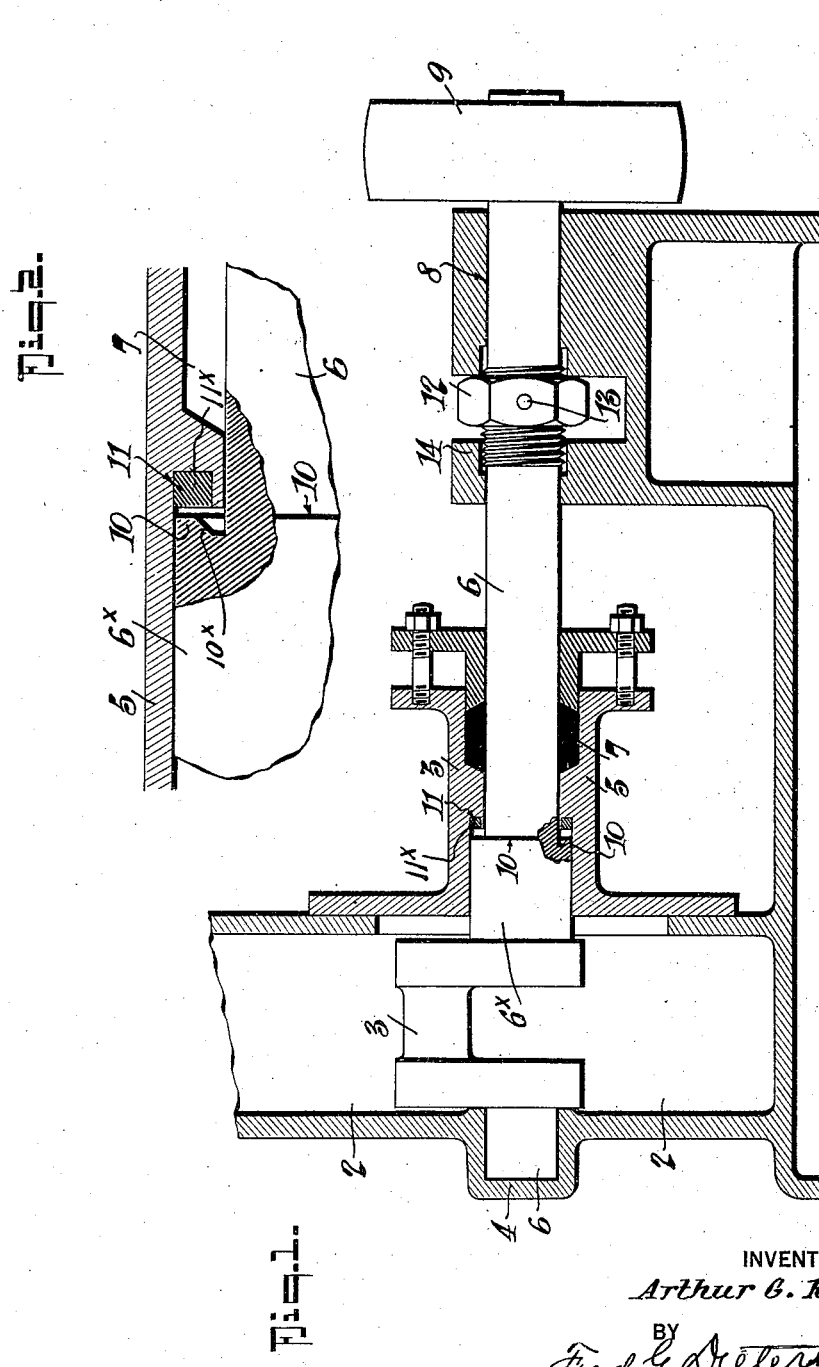
INVENTOR
Arthur G. Ross.
BY
Fred J. Dieterich
ATTORNEYS Patented Mar. 11, 1924.

1,486,161

UNITED STATES PATENT OFFICE.

ARTHUR G. ROSS, OF VANCOUVER, BRITISH COLUMBIA, CANADA.

SHAFT-BEARING SEAL.

Application filed October 11, 1922. Serial No. 593,932.

*To all whom it may concern:*

Be it known that I, ARTHUR G. Ross, a citizen of the Dominion of Canada, residing at Vancouver, in the Province of British Columbia, Canada, have invented certain new and useful Improvements in Shaft-Bearing Seals, of which the following is a specification.

This invention relates to a means for sealing a shaft against leakage past it while the gland is being re-packed.

Where a rotatable shaft passes from a chamber in which a volatile and possibly offensive gas is confined, as in the case of a refrigerating machine, using such gases as ammonia or ethyl chloride, the shaft is gland-packed to prevent escape of the gas, and when that gland requires to be re-packed, the chamber must at present be emptied of its contents to prevent escape of the liquid or gas during re-packing. This involves a considerable loss of time and possible inconvenience owing to the temporary cessation of the cooling.

It is to overcome this objection and enable such a shaft to be sealed against leakage past it, while the gland is being packed, that the invention, which is the subject of this application, has been devised.

The invention is particularly described in the following specification, reference being made to the drawings by which it is accompanied, in which:

Fig. 1 is a longitudinal section of a gland-packed shaft provided with this sealing means, and Fig. 2 is an enlarged detail of the sealing means in section.

In these drawings 2 represents the base of an ammonia tank, in which a crank 3 is rotatable in a closed bearing 4 at one end and an open bearing 5 at the other, through which the crank shaft 6 passes gland-packed at 7. The outer end of the shaft 6 is supported in a bearing 8 and to it is secured the pulley 9 or gear wheel by which the shaft is driven from any convenient source of power.

The crank shaft 6 is provided with an enlarged portion $6^x$ forming an annular seat 10 at one end which may be tightly drawn against the Babbitt metal ring 11 in and forming part of the shoulder of the bearing 5. The bearing 5 is provided with a shoulder having an annular recess $11^x$ in which is placed the ring of soft metal such as Babbitt metal. The seat 10 has a recess $10^x$ adjacent to the lesser diameter of the shaft 6 which serves to prevent contact between the metal of the shaft shoulder and opposing metal of the bearing 5 between the ring $11^x$ and the shaft 6.

The shaft 6 is retained against endwise movement with the seat 10 normally clear of the ring 11 by a nut 12 threaded on the shaft 6 to bear against the face of the bearing 8 and is retained in that position by a pin 13 through the nut. While running thus the gland 7 prevents leakage from the vessel 2 past the shaft 6, and when it is required to pack the gland 7 the pin 13 is withdrawn and the nut 12 is moved on its thread to bear against the face of a bearing 14 adjacent the inner end of the bearing 8. The shaft 6 is thereby endwise moved in the direction of the arrow to bring the ring seat 10 tightly against the soft metal ring 11 in the annular recess $11^x$ and effect thereat a tight closure against leakage from the vessel 2 past the shaft 6. The gland may then be safely repacked and thereafter the nut 12 may be restored to its normal position against the bearing 8 and secured by the pin 13.

Although described as a means for preventing leakage outward from a vessel, obviously the device is equally applicable to cases where it is desired to prevent leakage inward, as to a chamber wherein a vacuum is maintained.

I do not desire to be confined to the particular means here shown for effecting endwise movement of the shaft. The essential feature of the invention consists in the provision of the sealing seats corresponding to 10 and 11, and supplementary to the gland, with means for normally maintaining these seats out of contact and for endwise moving the shaft to effect closure at the seat when it is desired to pack the gland.

The device is an exceedingly convenient one as it enables a bearing of this kind to be packed with comfort and convenience without having first to empty the contents from the chamber from which the shaft passes.

Having now particularly described my invention, I hereby declare that what I claim as new and desire to be protected in by Letters Patent, is:

1. Means for sealing a shaft against leakage past it while its gland is being re-packed, said means comprising the combination with a shaft and a bearing therefor which is gland-packed to prevent leakage past it and which is provided with a shoulder, said shaft having a shoulder adapted to seat against said shoulder in the bearing, and means on the outer end of the shaft for normally maintaining the shoulder of the shaft clear of the shoulder of the bearing and for drawing the shoulder of the shaft tightly into contact with the shoulder of the bearing.

2. Means for sealing a shaft against leakage past it while its gland is being repacked, said means comprising the combination with a shaft and a bearing therefor which is gland-packed to prevent leakage past it, said bearing having a shoulder provided with a groove, a ring of soft metal in said groove, said shaft having a shoulder with an annular projection adapted to seat against said ring of soft metal in said shoulder of the bearing, and means on the outer end of the shaft for normally maintaining the shoulder of the shaft clear of the shoulder of the bearing and for drawing the shoulder of the shaft tightly into contact with the shoulder of the bearing.

3. Means for sealing a shaft against leakage past it while its gland is being repacked, said means comprising the axially adjustable shaft having a sealing surface, a stationary part having a cooperating sealing surface, spaced external thrust bearings through which the shaft passes, a screw thread and a nut on the shaft between the thrust bearings, said nut being adjustable into contact with either thrust bearing to move the shaft axially and engage or disengage the sealing surfaces.

In testimony whereof I affix my signature.

ARTHUR G. ROSS.